W. H. EDDY.
Drill-Sharpening Machine.
No. 166,515. Patented Aug. 10, 1875.
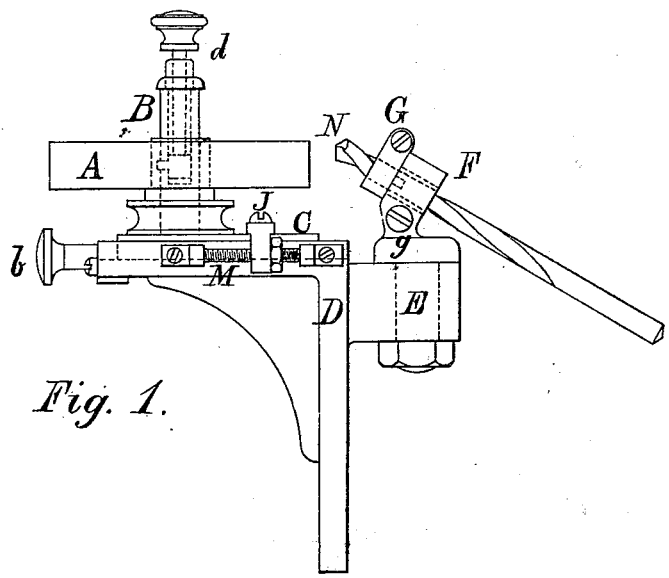
Fig. 1.
Fig. 2. Fig. 3.
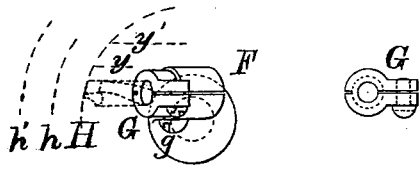 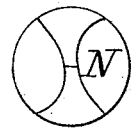
Witnesses:
Dan. Green
C. H. Brown
Inventor:
Wm. H. Eddy
by J. G. Arnold
Atty.

UNITED STATES PATENT OFFICE.

WILLIAM H. EDDY, OF WORCESTER, MASSACHUSETTS.

IMPROVEMENT IN DRILL-SHARPENING MACHINES.

Specification forming part of Letters Patent No. 166,515, dated August 10, 1875; application filed January 18, 1875.

*To all whom it may concern:*

Be it known that I, WILLIAM H. EDDY, of the city and county of Worcester, and State of Massachusetts, have invented a Machine for Grinding Twist and other Drills, of which the following is a specification:

My invention is designed to grind drills of any desired angle of point and cutting-edge, and at the same time "back them off," or, in other words, give them the necessary clearance. I accomplish these ends by holding the drills in an inclined holder placed eccentrically on the stud or pivot on which it swings, carrying the point of the drill against and by the grinding-wheel, the longitudinal central line of the drill being held inclined in a plane tangential to a smaller or larger circle concentric with the pivot, the size of the circle varying both the acuteness of the cutting-edge and backing off behind it, and with the incline giving the best form of cutting-edges, and forming a point or center nearly at right angles to them, and slightly rounding, in good form to keep its center and steady it when at work in drilling.

The accompanying drawings represent a machine embodying my invention.

Figure 1 is a side view, showing a twist-drill set in place to be ground. Fig. 2 is a view from above of the holder F on its stud. Fig. 3 shows the point of a twist-drill on a larger scale, the same letters indicating the same parts wherever they occur.

A is the grinding-wheel, revolving on the stud B by a belt on the grooved-wheel attached to it, or by any suitable means desired, and capable of being slid along the stud, as by the rod and its cap $d$. C is a plate or slide supporting the stud B, and moving in ways or grooves in the frame D, and operated by the screw $b$. E is a stud turning in the frame D, and forming a pivot to swing the holder and drills on, and to which the drill-holder F is attached and supported, the holder being so placed as to hold the drill to one side of the stud E, with which it turns to carry the end of the drill by the grinding-surface, the holder F being set inclined, so as to give the right pitch or angle to the point of the drill, and is fitted to receive the griping-collar G for twist-drills, and hold it firmly by tightening the screw $g$ or similar means. The griping-collar G is made to fit the drill, and is split or open on one side, and holds the drill near the point, and, being tightened on it by its screw, serves as a guide in grinding to keep the point true. The shoulder on it, fitting and resting on the holder F, forms a gage to turn the drill half round on, and a small pin, G, with two holes in F, or marks on each, may be used to determine the half-revolutions, to grind both edges of the drill alike, collars with different-sized holes being used for the different sizes of drills, so that each one is ground true, with its outside at or near the point.

In operation the drill is secured in the holder; if a twist-drill, place the edge to be ground a little in advance of a perpendicular line. The holder and drill are then swung on the pivot E, bringing the point of the latter to the grinding-wheel A, which is set in the proper position by its slide C and screw $b$, and the end of the drill passed by it; at the same time the wheel is shifted on its stud B by the rod $d$ to prevent creasing; then, loosening the holder, the drill is reversed or turned half round, and the other lip ground by a similar movement of the holder.

If it is desired to shift the wheel A and its slide C in the process of grinding, the nut on the screw M, which is fast on the frame, may be turned up against the arm J, which is fast to the slide C, so that the wheel can be returned to the same position. This gage enables me to grind shell-reamers on the same machine by placing them on a stud and holding them at E with any of the common devices for presenting each edge in position for the wheel to act on, the wheel being brought against it by its screw $b$, and moved the whole length of the reamer by the rod $d$. Variations of the angle of the cutting-edges may be made by either setting the holder F a greater or less distance on one side of E, as indicated by the lines $y$ $y'$, Fig. 2, or by extending the drills so that the end shall sweep on a circle corresponding to $h$ or $h'$, the grinding-wheel being set to agree in each case.

Thus it will be seen the machine is adapted to grind drills of all the different cutting angles desired for different kinds of work with facility and ease, making a good, true point, and always backing off the drill in a proper manner at one and the same motion that grinds the cutting-edge.

I claim—

1. The hinged holder F, arranged eccentrically on the oscillating fixture E, to bring the end of the drill past the grinding-surface, in combination with the grinding-wheel A, when constructed and operating substantially as described.

2. The griping-collar G, having a shoulder fitted on the holder F, in combination with the holder F, arranged eccentrically on the oscillating fixture E, as described, and the grinding-wheel A, when constructed and operating as and for the purposes described.

WILLIAM H. EDDY.

Witnesses:
DANL. GREEN,
ED. SHINN.